United States Patent
Allen et al.

(10) Patent No.: US 6,294,991 B1
(45) Date of Patent: *Sep. 25, 2001

(54) METHOD AND SYSTEM THEREFOR FOR ENSURING A TRUE ACTIVATION OF DISTRIBUTED RESTORATION IN A TELECOMMUNICATIONS NETWORK

(75) Inventors: John David Allen, Garland; Lee Bengston, Murphy; Jasvantrai Shah, Richardson, all of TX (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,177

(22) Filed: Sep. 8, 1998

(51) Int. Cl.⁷ .................................................. G08B 29/00
(52) U.S. Cl. .......................... 340/506; 340/507; 340/527; 340/529
(58) Field of Search ..................................... 340/506–507, 340/527–529; 370/241, 216, 248, 351

(56) References Cited

U.S. PATENT DOCUMENTS

| | | | |
|---|---|---|---|
| 4,648,088 | 8/1985 | Cagle et al. | 370/224 |
| 4,853,927 | 5/1989 | Wenzel | 370/218 |
| 4,884,263 | 11/1989 | Suzuki | 370/225 |
| 4,956,835 | 9/1990 | Grover | 370/228 |
| 5,070,497 | 12/1991 | Kleine-Altekamp | 370/217 |
| 5,146,452 | 9/1992 | Pekarske | 370/228 |
| 5,173,689 | 12/1992 | Kusano | 340/827 |
| 5,189,662 | 2/1993 | Kleine-Altekamp | 370/227 |
| 5,218,601 | 12/1990 | Chujo et al. | 370/228 |
| 5,233,600 | 8/1993 | Pekarske | 370/228 |
| 5,235,599 | 6/1994 | Nishimura | 714/4 |
| 5,319,632 | 7/1995 | Iwasaki | 370/228 |
| 5,325,366 | 6/1994 | Shinbashi | 714/712 |
| 5,435,003 | 7/1995 | Chng et al. | 714/4 |
| 5,455,832 | 10/1995 | Bowmaster | 714/712 |
| 5,479,608 | 12/1995 | Richardson | 714/4 |

(List continued on next page.)

FOREIGN PATENT DOCUMENTS

| | | |
|---|---|---|
| 96/41440 | 12/1996 | (WO) . |
| 97/48189 | 12/1997 | (WO) . |

OTHER PUBLICATIONS

Bouloutas et al. "Alarm Correlation and Fault Identification in Communication Networks"; 1994 IEEE Transactions and Communications.

Manione et al.; "An Inconsistencies Tolerant Approach in the Fault Design of Telecommunications Network"; Feb. 14, 1994.

*Primary Examiner*—Daryl Pope

(57) ABSTRACT

To ensure that the distributed restoration process of a DRA provisioned network proceeds only in response to true failures, the present invention DRA network provisions to each of the ports of the nodes a timer mechanism for ascertaining whether an alarm is a genuine alarm. This is done by presetting the timer with an expiration period so that an alarm is validated as a failure only upon the expiration of the timer. When validated, the value of a counter is incremented. The value of the counter is reflective of the sum of validated alarms, and is compared against a preset threshold value. And it is only when the value of the summed validated alarms exceeds the preset threshold value would the DRA process be initiated. When a validated alarm ceases, the reverse process takes place. That is, the ending of the alarm has to be validated by another timer, which could be the same timer as used for validating an alarm. The counter is decremented for each validated non-alarm, so that when the value of the defect counter falls below the threshold value, the DRA process is reset.

12 Claims, 4 Drawing Sheets

U.S. PATENT DOCUMENTS

| | | | | |
|---|---|---|---|---|
| 5,493,273 | * | 2/1996 | Smurlo et al. | 340/541 |
| 5,495,471 | | 2/1996 | Chow et al. | 370/221 |
| 5,537,532 | | 7/1996 | Chng et al. | 714/4 |
| 5,548,639 | | 8/1996 | Ogura | 379/221 |
| 5,586,112 | | 12/1996 | Tabata | 370/225 |
| 5,590,118 | | 12/1996 | Nederlof | 370/218 |
| 5,590,119 | | 12/1996 | Moran et al. | 370/351 |
| 5,598,403 | | 6/1995 | Tatsuki | 370/221 |
| 5,623,481 | | 4/1997 | Russ et al. | 370/248 |
| 5,636,203 | | 6/1997 | Shah | 370/244 |
| 5,636,206 | | 6/1997 | Amemiya et al. | 370/244 |
| 5,646,936 | | 7/1997 | Shah et al. | 370/228 |
| 5,657,320 | | 8/1997 | Russ et al. | 370/217 |
| 5,680,326 | | 10/1997 | Russ et al. | 714/4 |
| 5,710,777 | | 2/1998 | Gawne | 714/717 |
| 5,721,727 | | 2/1998 | Ashi et al. | 370/244 |
| 5,734,687 | | 3/1998 | Kainulainen | 375/357 |
| 5,748,611 | | 5/1998 | Allen et al. | 370/221 |
| 5,748,617 | | 5/1998 | McLain, Jr. | 370/244 |
| 5,757,774 | | 5/1998 | Oka | 370/242 |
| 5,781,535 | | 7/1998 | Russ et al. | 370/248 |
| 5,802,144 | | 9/1998 | Laird et al. | 379/32 |
| 5,812,524 | | 9/1998 | Moran et al. | 340/827 |
| 5,832,196 | | 11/1998 | Croslin et al. | 714/4 |
| 5,838,660 | | 11/1998 | Croslin | 370/216 |
| 5,841,759 | | 1/1997 | Russ et al. | 370/221 |
| 5,850,505 | | 12/1998 | Grover et al. | 714/4 |
| 5,852,600 | | 12/1998 | Russ | 370/228 |
| 5,862,125 | | 6/1999 | Russ | 370/228 |
| 5,862,362 | | 1/1999 | Somasegar et al. | 703/21 |
| 5,867,689 | | 2/1999 | McLain, Jr. | 340/825.03 |
| 5,933,422 | | 8/1999 | Kusano et al. | 370/331 |
| 5,943,314 | | 8/1999 | Croslin | 370/216 |
| 5,991,338 | | 11/1999 | Trommel | 375/224 |
| 5,999,286 | | 12/1999 | Venkatesan | 359/117 |
| 6,026,077 | | 2/2000 | Iwata | 370/254 |
| 6,044,064 | | 3/2000 | Brimmage et al. | 370/216 |
| 6,049,529 | | 4/2000 | Brimmage et al. | 370/241 |
| 6,104,695 | | 8/2000 | Wesley et al. | 370/216 |
| 6,108,309 | | 8/2000 | Cohoe et al. | 370/241 |
| 6,137,775 | | 10/2000 | Bartlett et al. | 370/216 |
| 6,154,448 | | 11/2000 | Peterson et al. | 370/248 |
| 6,167,025 | | 12/2000 | Hsing et al. | 370/216 |

* cited by examiner

METHOD AND SYSTEM THEREFOR FOR ENSURING A TRUE ACTIVATION OF DISTRIBUTED RESTORATION IN A TELECOMMUNICATIONS NETWORK

CROSS REFERENCE TO RELATED APPLICATIONS

The instant invention relates to the following applications having Ser. Nos. 08/825,440 filed Mar. 28, 1997, 08/825,441 filed Mar. 28, 1997, 09/046,089 filed Mar. 23,1998, Ser. No. 09/148,944 filed Sep. 8, 1998 entitled "Restricted Reuse of Intact Portions of Failed Paths", and Ser. No. 09/149,591 filed Sep. 8, 1998 entitled "Signal Conversion for Fault Isolation". The respective disclosures of those applications are incorporated by reference to the disclosure of the instant application.

The instant invention further relates to applications Ser. Nos. 08/483,579 filed Jun. 7, 1995, 08/736,800 filed Oct. 25, 1996 and 08/781,495 filed Jan. 13, 1997. The respective disclosures of those applications are likewise incorporated by reference to the instant application.

This application is further related to the invention entitled "Method and Message Therefor of Monitoring the Spare Capacity of a DTNR Network" with filed Jul. 30, 1999, now abandoned, the disclosure of which being incorporated by reference herein.

This application is yet further related to the invention entitled "Quantification Of The Quality Of Spare Links In A Telecommunications Network", with Ser. No. 09/149,590 filed Sep. 8, 1998, the disclosure of which being incorporated by reference herein.

This application is still yet further related to the invention entitled "Method of Coordinating the Respective Operations of Different Restoration Processes" with Ser. No. 09/149, 590 filed Sep. 8, 1998, the disclosure of which being incorporated by reference herein.

FILED OF THE INVENTION

This invention relates to distributed restoration algorithm (DRA) networks, and more particularly to a method and system therefor of ensuring that the triggering of the distributed restoration process in a telecommunications network is not due to false alarms or failures.

BACKGROUND OF THE INVENTION

A telecommunications network may employ a combination of several approaches for restoring traffic flow interrupted by equipment failure or malfunction. For example, a network may rely upon a 1:1 automatic protect switching for some portions, distributed restoration (DRA) for other portions or domains of the network, and finally a centralized control of rerouting for situations not readily handled by the other approaches or schemes.

The automatic protection switching (APS) scheme, although wasteful of bandwidth, nonetheless is useful in some cases where simplicity and speed are required. The DRA scheme, on the other hand, takes slightly longer and may conceivably be considered more complex. But the DRA scheme is also more adaptable than APS and can leverage mesh restorability. For both APS and DRA schemes, restoration is triggered by the detection of transmission alarm conditions that result from occurred failures.

In a network where there are a number of schemes such as APS and DRA, even though the failure may quickly be circumvented by the APS scheme, the DRA provisioned nodes of the network may also begin to respond to the same failure, all of the while oblivious to the activities being carried on by the APS process. Such unnecessary triggering of the DRA process is undesirable, insofar as the DRA provisioned portion of the network, while the DRA process is ongoing, becomes vulnerable as the DRA process seeks to reserve spare links for the distributed restoration. Accordingly, any subsequent real failures could be precluded from complete and timely restoration due to this false triggering of the DRA process. To overcome this shortcoming, the DRA scheme must verify the genuineness of the failure before taking action.

It would appear that a simple solution is the provision of a timer. However, the provision of a timer for such multi-restoration schemes is inadequate because there are numerous links that interconnect the nodes of the network, and any one of those links can generate an alarm condition. It is therefore possible for two or more separate short duration alarm events to overlap enough so that those events would appear to be a single long duration alarm event, thereby activating the DRA process.

There is therefore a need for a robust method for determining when a DRA process may be activated.

Moreover, there is a need to have the DRA process start as quickly as possible, when it is needed, and yet not be triggered by false alarms.

SUMMARY OF THE PRESENT INVENTION

To ensure that a true activation of the DRA process takes place in the DRA provisioned domains of a network, each port of a node, or for example the digital cross-connect or an intelligent device, of the network is provided with a defect validation timer. This timer is user programable and could be preset, for example, with a nominal value of 100 ms. When an alarm condition is received, the timer is started. And if the alarm condition persists until the timer expires, then the alarm is deemed validated. In other words, the alarm is deemed to be a true alarm that merits the activation of the DRA process.

Once validated, an alarm can only be idled if it becomes inactive and remains inactive for a period of time. In practice, the same defect validation timer can be used for idling an alarm. Thus, when an alarm goes inactive, it starts the timer and the inactive state of the alarm is validated when the inactive alarm persists until the defect validation timer expires.

In the meantime, the quantity of the validated alarms is maintained by a defect counter, which is programmed with a predetermined threshold value. If the number of validated alarms, as counted by the counter, exceeds the preset threshold, the DRA process is initiated.

As alarms can come and go in a network, there may actually be continuous incrementing, as well as decrementing, of the count in the defect counter. But so long as the summed validated alarms remains above the preset threshold, the DRA process continues.

The present invention therefore achieves the objective of providing a more reliable, yet timely, initiation of the DRA process in a network so that the DRA process can coexist with other restoration processes such as the APS and central restoration schemes.

The instant invention achieves the further objective of adapting the initiation of the DRA process to the access/egress ports of the nodes of the network.

BRIEF DESCRIPTION OF THE FIGURES

The above-mentioned objectives and advantages of the present invention will become more apparent and the invention itself will be best understood by reference to the following description of an embodiment of the invention taken in conjunction with the accompanying drawings, wherein.

DETAILED DESCRIPTION OF THE PRESENT INVENTION

Figure 1:
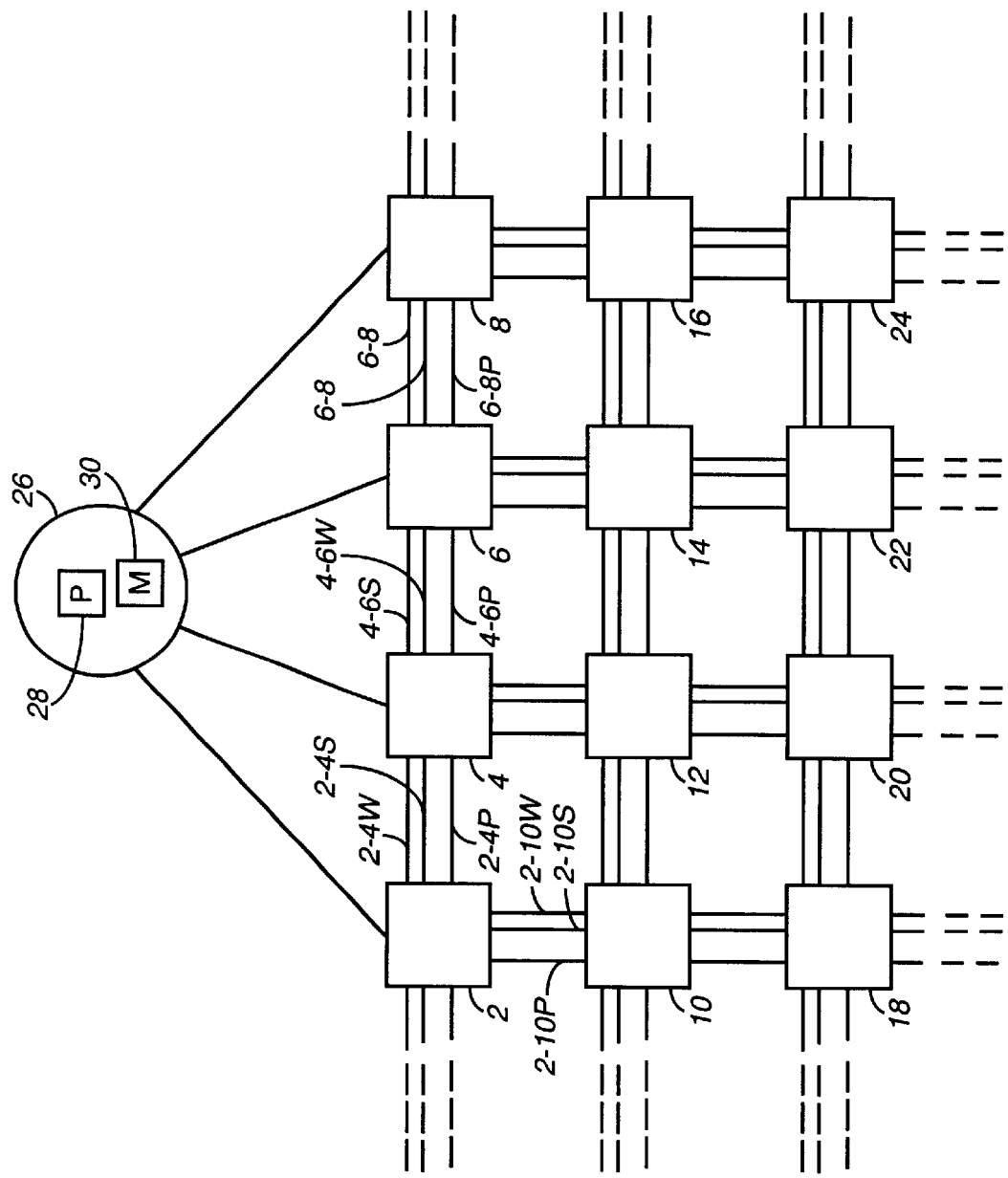
FIG. 1 is an illustration of a telecommunications network of the instant invention.

FIG. 1 illustrates an exemplar telecommunications network that includes a number of interconnected nodes 2–24 each being cross-connected to its adjacent nodes by at least one span, or at least one working link and one spare link. For example, node 2 is connected to node 4 by means of working link 2-4W and a spare link 2-4S. Similarly, node 4 is connected to node 6 by a working link 4-6W and a spare link 4-6S. Further connecting the adjacent nodes, insofar as the exemplar network of FIG. 1 is assumed to include a number of restoration schemes, is a dedicated line connecting each of the pairs of adjacent nodes for the APS process. Thus, as shown, a dedicated line or link 2-4P cross-connects nodes 2 and 4, while a dedicated line 4-6P cross-connects nodes 4 and 6. In essence, each of the dedicated lines, 2-4P and 4-6P for example, is used to reroute the traffic between its associated pair of adjacent nodes (2, 4 and 4, 6 for example) if traffic is disrupted between those nodes. For the sake of simplicity, only the dedicated lines cross-connecting nodes 2 to 4, 4 to 6, 6 to 8 and 2 to 10 are labeled in the FIG. 1 exemplar network.

For the telecommunications network of FIG. 1, it is assumed that all of the nodes shown are provisioned with both a distributed restoration algorithm (DRA) scheme as well as a 1:1 APS restoration scheme.

Further shown in FIG. 1 is an operation support system (OSS) 26 that oversees and monitors the overall operation of the network. Given that OSS 26 has an overall view, or map, of the layout of each node within the network, it can provide a centralized restoration when a fault occurs anywhere within the network. As shown, OSS 26 has a memory store 30 into which data retrieved from the various nodes are stored. An interface unit, not shown, provides interfacing between OSS 26 and the nodes of the network. For the sake of simplicity, only nodes 2, 4, 6, and 8 are shown to be connected to OSS 26.

Each of the nodes 2–24 of the network of FIG. 1 comprises a cross-connect switch such as for example the 1633-SX broadband cross-connect switch made by the Alcatel Network System Company. Two of such switches, for example nodes 2 and 4, are shown in more detail in FIG. 2. As shown, each of the switches has a number of access/egress ports such as for example 32 and 34 in node 2 and 36 and 38 in node 4. Each of those access/egress ports is shown to be multiplexed to a line terminating equipment (LTE). It is by means of these LTEs that the adjacent nodes are cross-connected to each other. Thus, as shown, access/egress port 32 is connected to LTE 40 while access/egress port 34 of node 2 is connected to LTE 42. Likewise, for node 4, access/egress port 36 outputs to LTE 44 while access/egress port 38 outputs to LTE 46.

Note that the LTEs are SONET equipment each having a detector residing therein to detecting any failure of the links between the digital cross-connect switches. Note further that the detecting circuit for detecting whether a communication failure has occurred may also be incorporated within the respective nodes, as printed circuit (PC) cards inserted at the various access/egress ports. Furthermore, there might be a greater number of links connecting the node to its LTE, as compared to the links or spans connecting two LTEs, as the lines cross-connecting the LTEs may be OC-48 lines, while those connecting the digital cross-connect switch to the LTE may be OC-12 fibers. Finally, note that even though optical carrier fibers are shown, the instant invention is equally applicable to synchronous transport signal level (STS-N) lines such as for example STS-1 or STS-3 lines.

Figure 2:
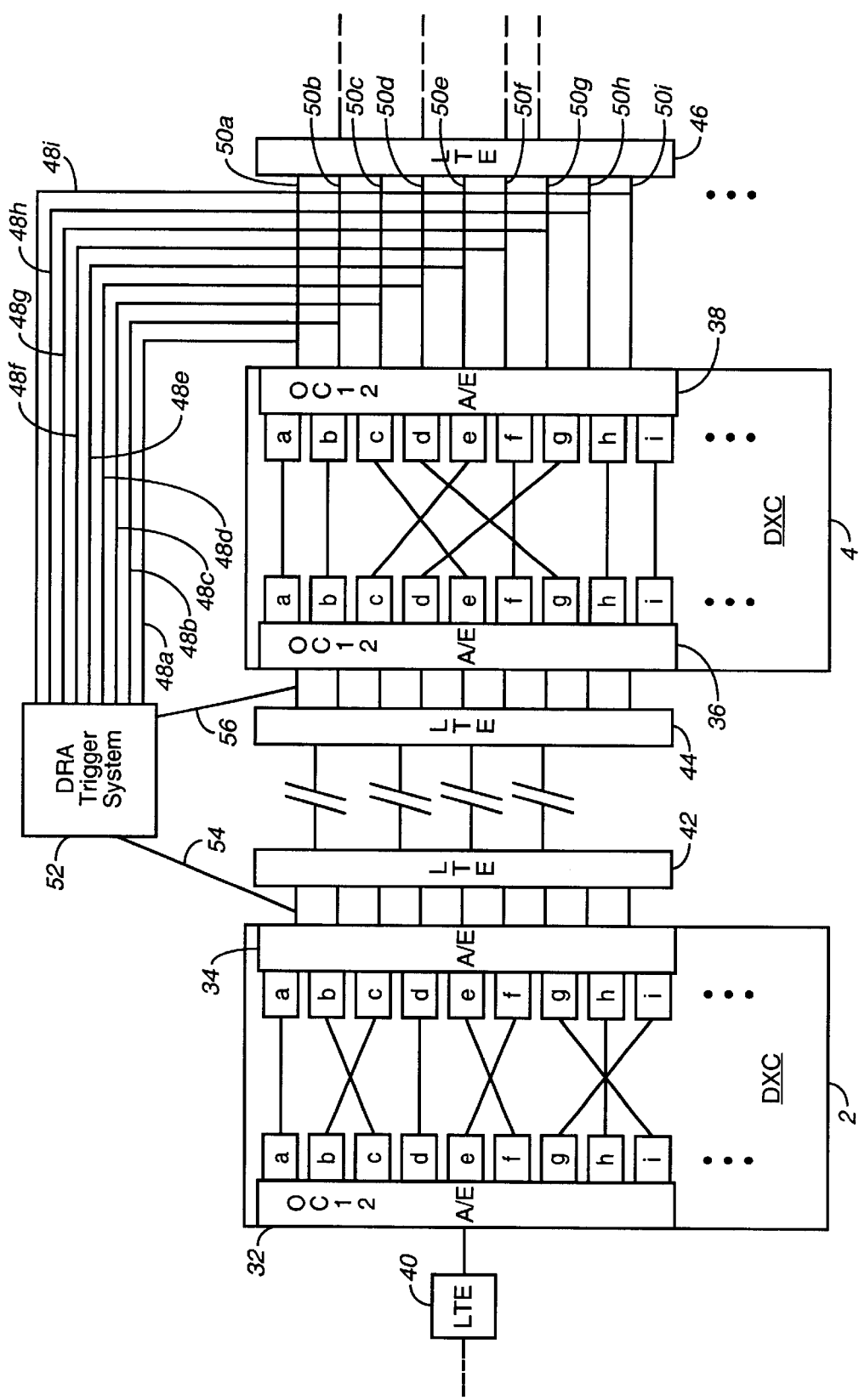
FIG. 2 is an illustration of two adjacent cross-connected nodes having added thereto equipment for ensuring that the activation of the DRA process is not done falsely.

For the example embodiment of the instant invention, each of the nodes 2 and 4 of FIG. 2 is shown to include access/egress ports that include a number of individual ports a–i, etc. Each of these individual ports outputs from its node to a particular link, such as for example 50a–50i for access/egress port 38 of node 4. Similar links connect the other access/egress ports of the other nodes to corresponding LTEs.

For an understanding of the instant invention, consider links 50a–50i cross-connecting access/egress port 38 to LTE 46. As was mentioned previously, circuits provided at the LTE, or within node 4 as PC cards at access/egress port 38, can detect any failure or malfunction that occurs at any one of the links cross-connecting a node, for example node 4, with its adjacent node, for example node 6 shown in FIG. 1. For the instant invention, for the purpose of explanation, a plurality of lines 48a to 48i extend respectively from links 50a to 50i to a DRA trigger system 52. In actuality, note that the DRA trigger system 52 in fact resides in each of the cross-connect or intelligence devices. Lines similar to 48a–48i for sending information to DRA trigger system 52 likewise are provided from the links cross-connecting access/egress port 38 and LTE 42, designated as 54, and the links cross-connecting access/egress port 36 and LTE 44, designated as 56. Assume that each of links 54 and 56 in fact contains multiple lines such as for example those represented by lines 48a–48i. Thus, for the instant invention, each access/egress port of each of the nodes of the network is assumed to be communicatively connected to DRA trigger system 52.

Figure 3:
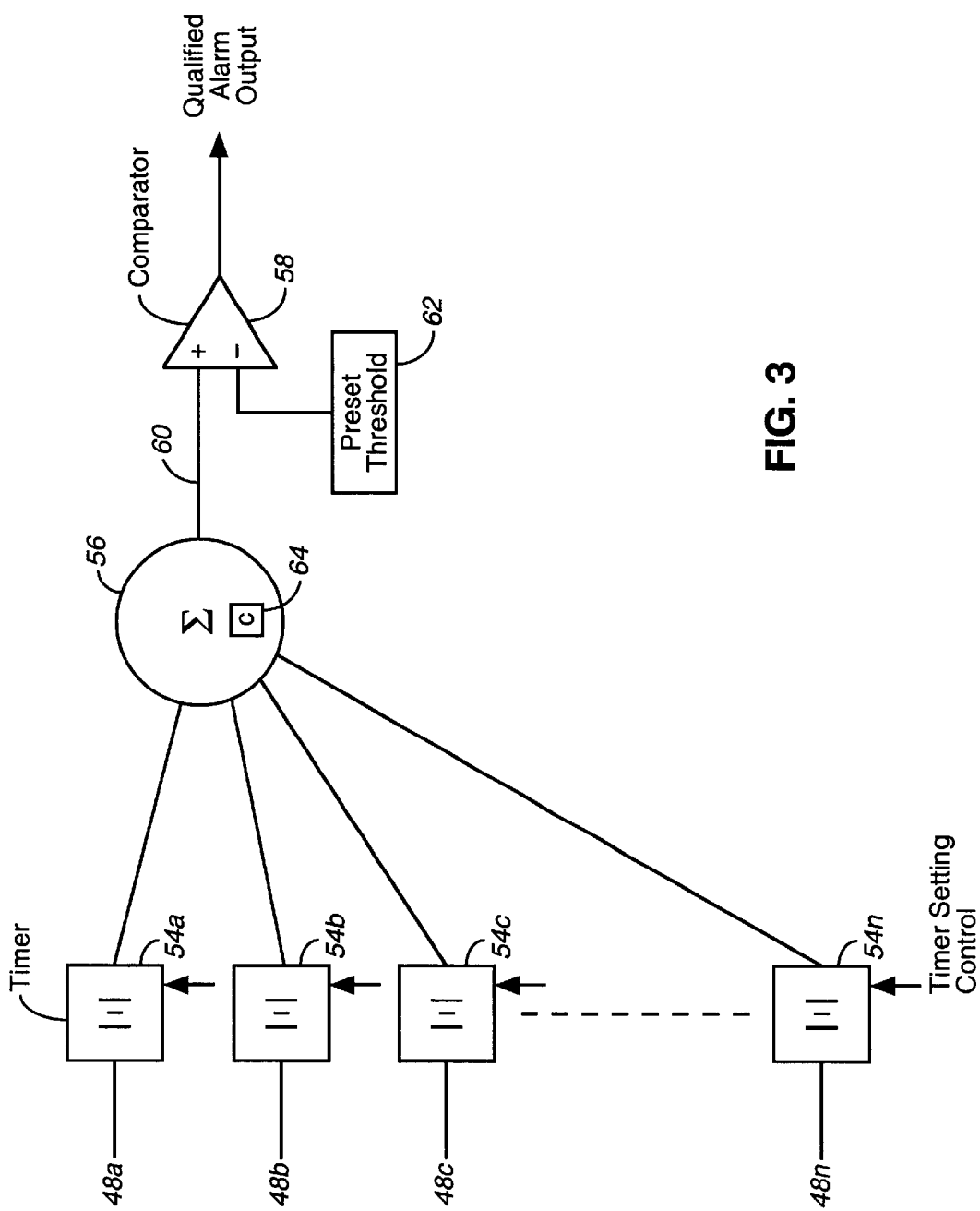
FIG. 3 is an exemplar circuit of the DRA trigger system of the instant invention.

With reference to FIG. 3, a conceptual configuration of DRA trigger system 52 is illustrated with respect to the lines input thereto from links 50a–50i. As shown, lines 48a–48i and beyond are assumed to be connect to DRA trigger system 52 by way of respective timers 54a–54n. Timers 54a–54n each are considered a rolling off timer with de-glitch functions. Once set, the timers each will expire after a predetermined period of time. The period of time for each timer is set by a timer setting control which, for the instant invention, is set to have a nominal value of 100 ms, for example. Thus, for the instant invention, when an event, such as for example an alarm, occurs in any one of links 50a–50i, the line corresponding to the link where the event occurs would provide a signal to its corresponding timer to begin counting down the preset time. And when the preset time is reached, the timer expires.

In a typical network, it is not unusual for a number of alarms or transients to occur at any given time. Usually such transient events are ignored. However, if the transient event is of sufficient magnitude so that traffic is disrupted, the restoration scheme provided in the network would begin restoration to restore the traffic. In the case that the network is provisioned with both APS and DRA, when a brief transient of sufficient magnitude occurs, the APS process begins and in a very brief time would reroute the traffic to the dedicated line(s) from the malfunctioned link. For example, were link 2-4W connecting nodes 2 and 4 to fail, using the APS process, the traffic is rerouted to 2-4P.

Yet the fault at link 2-4W is also detected by those nodes that are provisioned with DRA so that even though the fault has been rerouted by a different scheme, the DRA process is nonetheless initiated under this scenario. The instant invention aims to eliminate such unnecessary utilization of resources by providing the timers as shown in FIG. 3 so that when a fault is detected, unless that fault persists beyond the expiration of the timer, it is not deemed to be a true or actual fault. In which case that fault is disregarded.

Because the initiation of a DRA process is based on the number of alarms or faults that are detected, the instant invention, as embodied by the exemplar circuit of FIG. 3, has each of the timers connect to a summer 56, which sums the various alarms. This summed value is then provided to a comparator 58 by means of an input 60. Comparator 58 is provided with a predetermined preset threshold value 62. Thus, if the summed alarms were to exceed the value of the preset threshold, a signal for initiating the DRA process is output from comparator 58. On the other hand, if the summed value of the alarms is less than or equal to the preset threshold value, the DRA process will not be initiated.

Thus, to eliminate unwarranted activation of the DRA process, the instant invention provides at each port of each node a timer with a predetermined expiration time. When an alarm is sensed at any one of the links, the port to which the link is connected outputs to its associated timer a signal for initiating the timer to begin a validation period. For the instant invention, to ensure that the alarm is not transient, the timer would send the alarm to summer 56 only after it has been validated as a genuine alarm. Summer 56 then sums all of the alarm signals it receives. The summed value of the alarms is next compared with a preset threshold for determining whether the DRA process for restoring disrupted traffic should be activated.

As was noted earlier, many of the alarms are of transient nature and are of such magnitude that they will not become actual alarms. In addition, the number of alarms summed at summer 56 at any period of time could in fact vary as a function of time. Thus, in order to better calculate at any instant of time the total number of alarms summed, a defect counter 64 is provided in, or works cooperatively with, summer 56 for keeping an accurate count of the number of alarms that are summed. Thus, each time an alarm is detected from a given port, such alarm is counted by and increments counter 64. Conversely, each time an alarm ceases, the count in counter 64 is decremented. Thus, for the exemplar embodiment shown in FIG. 3, assuming that only validated alarms are counted to initiate the DRA process, those validation alarms need to add up to a value greater than the preset threshold, before a signal is output to initiate the DRA process.

For the exemplar embodiment of the instant invention, albeit optical fibers are shown for interconnecting the nodes of the network, in actuality, those optical fibers are interchangeable with synchronous transport signal (STS-n) lines. Given that each port can carry a STS-n signal, such as for example a STS-3 signal, to accurately reflect the number of alarms, counter 64 will count each validated STS-n alarm as n alarms. In other words, if a validated STS-3 alarm is provided to summer 56, counter 64 will be incremented by a value of 3. And if a DS3 or STS-1 validated defect is input to summer 56, counter 64 will increment its count by 1. Conversely, after expiration of a timer, if a defect has cleared, the defect validation timer will be reset and the counter 64 is decremented.

Figure 4:
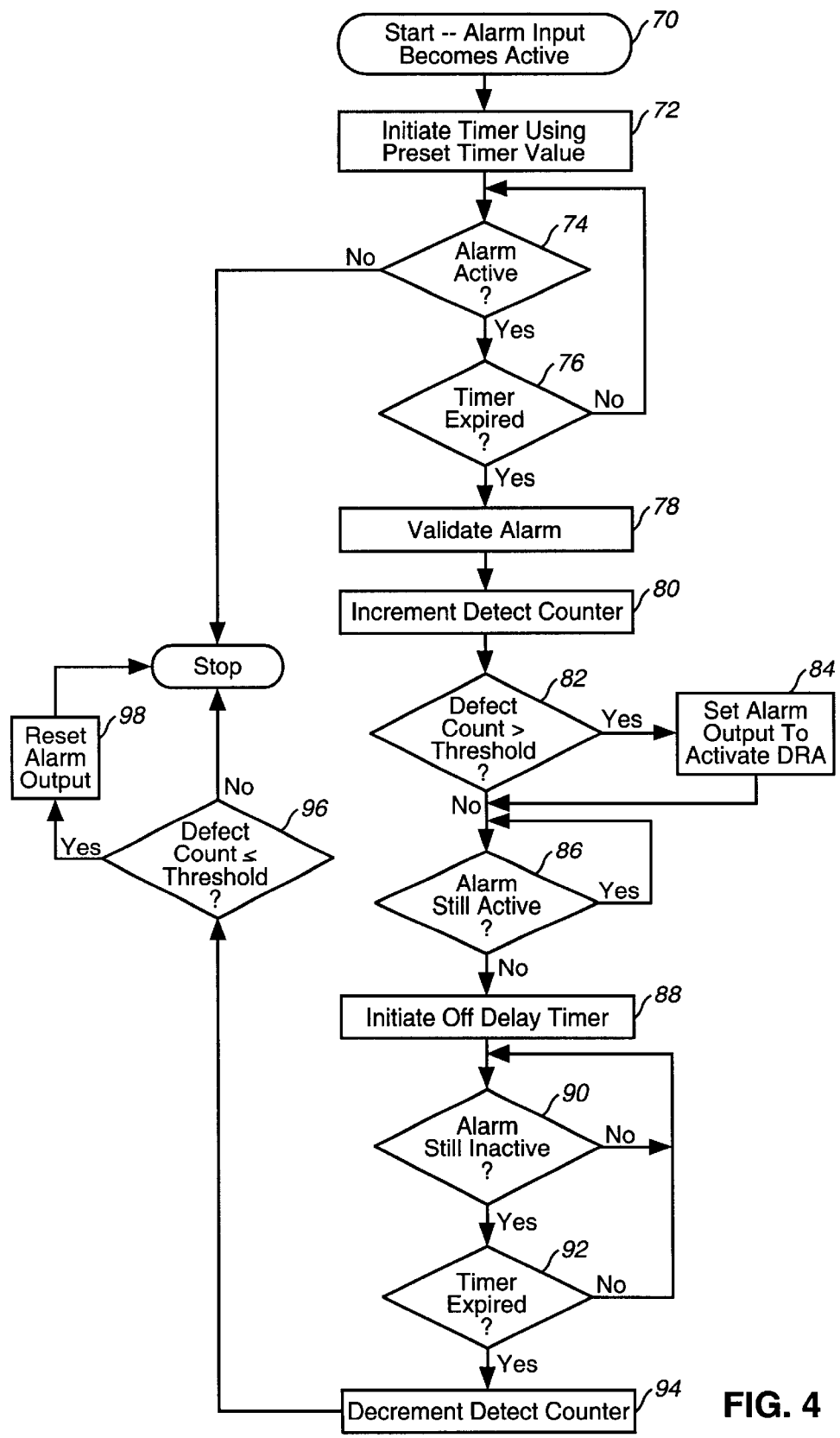
FIG. 4 is a flow chart illustrating the operational steps of the instant invention.

FIG. 4 is a flow chart that illustrates the operational steps of the instant invention. As shown, the process begins at step 70 in which an alarm input becomes active or detected. Thereafter, the delay timer with the preset timer value is initiated, per step 72. Next, for that particular timer, a determination is made per step 74 on whether the alarm is still active. If the alarm is no longer active, the process stops.

On the other hand, if the alarm remains active, the process proceeds to determine whether the timer has expired, per decisional step 76. So long as the timer has not expired, the process returns to step 74 to continue to monitor whether the alarm is still active. After the expiration of the timer per step 76, the alarm is validated per step 78. The counter in the DRA trigger system, and more specifically summer 56, is thereafter incremented and counted, per step 80. At step 82, a determination is made on whether the value of the defect counter exceeds the preset threshold for initializing the DRA process. If it is, an output is provided to activate the DRA process, per step 84.

On the other hand, if the defect count is less than the threshold value as determined by step 82, the process continues to step 86 to determine whether the alarm is still active. If it is, the state of the alarm continues to be monitored. If the alarm is deemed not to be active, the process proceeds to step 88 whereby the delay timer is activated in its reverse stage, i.e., a determination of whether indeed the alarm has ceased. Thereafter, the process determines whether the alarm remains inactive, per step 90. If it is, determination is made per step 92 on whether the off delay timer has expired. If it has not, the process continues to monitor the status of the alarm signal. If it is determined that the off delay timer indeed has expired, then the process proceeds to step 94 to decrement the defect counter, as the alarm has been validated as having ceased.

Thereafter, the process proceeds to determine whether the defect count in the counter is less than or equal to the preset threshold, per step 96. It is, the alarm output for activating the DRA process is reset, per step 98. If it is not, the process stops.

Inasmuch, as the present invention is subject to many variations, modification and changed in detail, it is intended that all matter described throughout this specification and shown in the accompanying drawings be interpreted as illustrative only and not in a limiting sense. Accordingly, it is intended that the present invention be limited only by the spirit and scope by hereto appended claims.

What is claimed is:

1. In a distributed restoration algorithm (DRA) provisioned telecommunications network having a plurality of interconnected nodes each including a plurality of access/egress ports, a method of ensuring that a DRA process for distributedly restoring disrupted traffic is not triggered in said network due to false alarms, comprising the steps of:

communicatively connecting to each port of each node in said network a durational timer means;

initiating the timer means associated with said each port when an alarm is output therefrom;

summing the number of alarms detected by and validated by corresponding timer means; and initiating said DRA process if the value of the summed alarms is greater than a predetermined threshold value.

2. The method of claim 1, wherein said step c further comprises the step of:

maintaining a counter to count the number of validated alarms;

wherein said counter increments its count each time a validated alarm from a port is detected and decrements its count each time an alarm from a port is validated to have ceased.

3. The method of claim 1, wherein each of said timer means starts a validation period upon detection of an alarm, further comprising the step of:

confirming said detected alarm to be a true alarm if said detected alarm persists after the expiration of the validation period of said timer means.

4. The method of claim 2, further comprising the step of:

counting each failed synchronous transport signal (STS-n) as n alarms so that the count of said counter is incremented n times when a STS-n alarm is validated and decremented n times when a STS-n alarm is validated to have ceased.

5. In a distributed restoration algorithm (DRA) provisioned telecommunications network having a plurality of interconnected nodes, a method of ensuring that a DRA process for distributedly restoring disrupted traffic is not triggered in said network due to false alarms, comprising the steps of:

monitoring and detecting alarms output from each node of said network;

starting a durational timer associated with each detected alarm;

summing the number of detected alarms;

comparing the summed alarm number with a predetermined value; and initiating said DRA process if the value of the summed alarms is greater than said predetermined value.

6. The method of claim 5, further comprising the step of:

effecting a counter to sum said value of detected alarms, said value being incremented each time a validated alarm is detected and decremented each time an alarm is validated to have ceased.

7. The method of claim 5, further comprising the step of:

confirming said each detected alarm to be a real fault if said each detected alarm persists after its associated timer has expired.

8. The method of claim 5, further comprising the step of:

counting each failed synchronous transport signal (STS-n) as n alarms so that the number of detected alarm s is incremented n times when a STS-n alarm is detected and decremented n times when a STS-n alarm ceases.

9. A distributed restoration algorithm (DRA) provisioned telecommunications network adapted to initiate a DRA process for distributedly restoring disrupted traffic in said network only in response to true alarms, comprising:

a plurality of interconnected nodes each including a plurality of access/egress ports;

respective durational timers communicatively connected to corresponding ports of each node in said network, each of said respective timers associated with a corresponding port being initiated when an alarm is output from said corresponding port;

summer means for summing the number of alarms validated by respective ones of said timers; and comparator means for comparing the summed number of alarms against a predetermined threshold value;

wherein said DRA process is initiated when said summed number of alarms is greater than said predetermined threshold value.

10. The network of claim 9, wherein said summer means comprises:

a counter for counting the number of alarms, said counter incrementing its count each time an alarm from a port is validated and decrementing its count each time an alarm from a port is validated to have ceased.

11. The network of claim 9, wherein each of said respective timers starts a validation period upon detection of an alarm; and wherein said detected alarm is confirmed to be an actual alarm if it persists after the expiration of the validation period of said each timer.

12. The network of claim 10, wherein said counter counts each failed synchronous transport signal (STS-n) as n alarms so that the count of said counter is incremented n times when a STS-n alarm is validated and decremented n times when a STS-n alarm is validated to have ceased.

* * * * *